Patented June 29, 1937

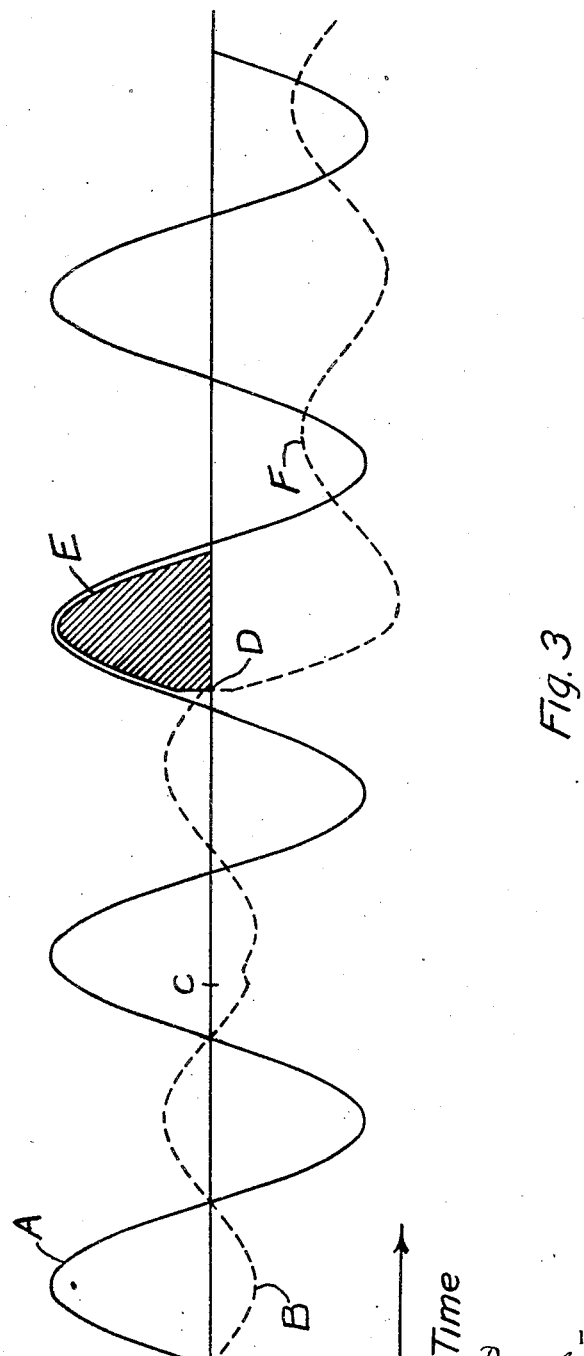

2,085,696

UNITED STATES PATENT OFFICE 2,085,696

ELECTRIC WELD TIMER AND METHOD

Donald V. Edwards, Montclair, N. J., assignor to Electrons, Inc. of Delaware, a corporation of Delaware Application November 22, 1933, Serial No. 699,118

13 Claims. (Cl. 250—27)

This invention relates to apparatus and circuits for controlling the quantity of electrical energy supplied to current consuming devices, such as electric welding machines, and particularly to timers for resistance-type welders.

The object of the invention is to control the application of a supply voltage to a load for short periods, preferably one cycle or less of the supply so as to make the voltage impulse fixed and uniform for each operation.

A further object is to provide a simple and inexpensive apparatus employing only one grid controlled rectifier tube per half-wave, to deliver such an impulse, or a desired quantity of electrical energy, at each operation of a control mechanism regardless of the human element in operating the said mechanism.

Among the features of the invention are: A phase shift of grid potential preparatory to the operative period to fix its starting point, and a storage of energy from the load current to prevent restarting; complete control from the alternating current power supply, no source of continuous current being required; and the use of only a few simple auxiliary devices in a simple circuit.

Figure 1:
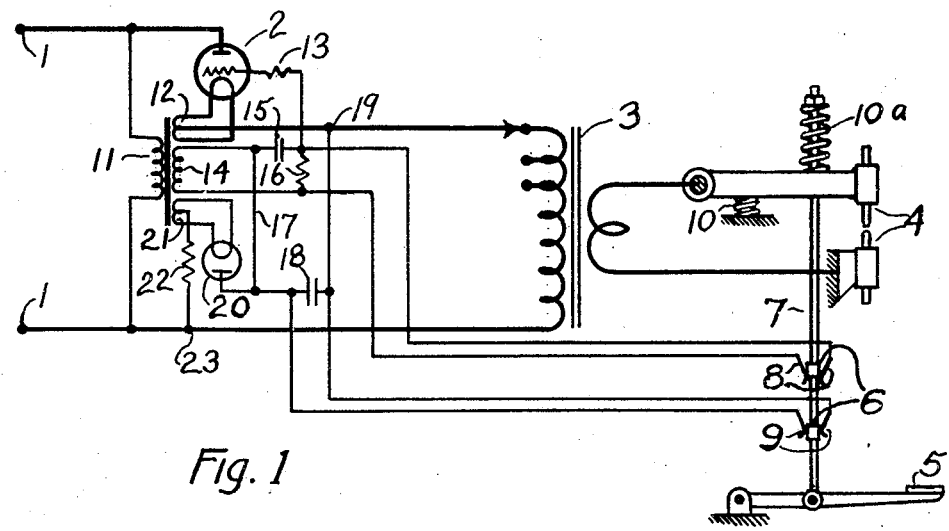
Figure 2:
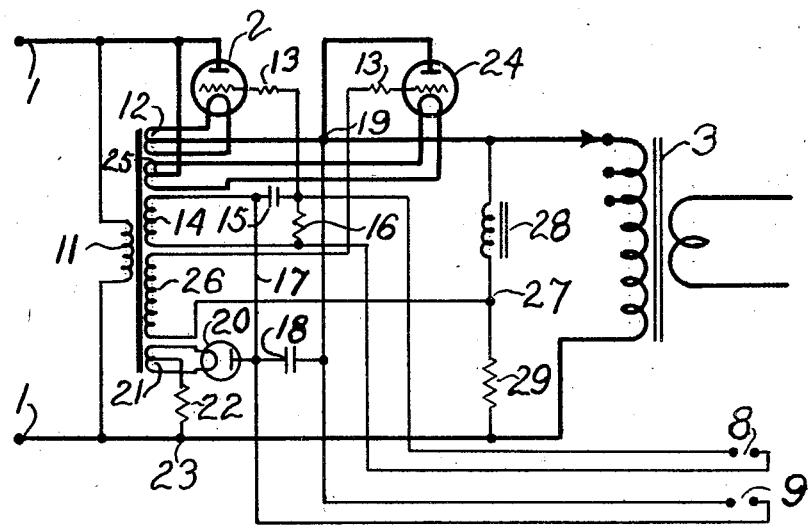

The invention will be described with reference to the accompanying drawings, in which:

Fig. 1 is a schematic illustration of one embodiment of the invention applied to a spot welder, the circuit being adapted to pass a single half-cycle at each operation, Fig. 2 shows a modified circuit adapted to pass one cycle at each operation, and Fig. 3 shows curves representing certain voltage relations during operation of the circuit of Fig. 1.

In Figs. 1 and 2 like reference characters indicate like parts.

The embodiment of the invention shown in Fig. 1 has a pair of terminals 1 for connection to a suitable alternating current source and a main or power circuit connected across these terminals, consisting of a grid controlled rectifier or "trigger" tube 2 and a load such as the primary winding of a welding transformer 3 which is preferably tapped. The rectifier 2 has the usual anode, control grid, and cathode, the anode being connected to one of the supply terminals 1. The secondary winding of the step-down transformer 3 is adapted to supply welding currents and is connected to welding electrodes 4, one of which is movable by the lever 5 and rod 7. This rod operates two electrical contactors such as insulated metallic sleeves 6 each adapted to open and close a circuit through pairs of contacts 8 and 9, respectively. An auxiliary transformer has its primary winding 11 connected across the terminals 1 and one secondary winding 12 of this transformer provides heating current for the cathode of rectifier 2. Another secondary winding 14 furnishes an alternating potential for the grid of the rectifier. This winding is part of a closed circuit through a condenser 15 and a resistance 16, the point common to this condenser and resistance being connected through a grid resistor 13 to the grid of rectifier 2. The upper sleeve 6 on the rod 7 is adapted to short-circuit resistance 16 by shorting the contacts 8. A shunt circuit across the primary winding of transformer 3 starts at point 19 between one end thereof and the cathode of rectifier 2, thence through condenser 18, rectifier 20, its cathode heating secondary 21, and resistance 22 to point 23 and the other end of the primary of transformer 3. A point in this shunt circuit between condenser 18 and the anode of rectifier 20 is connected to the grid circuit of rectifier 2 by conductor 17, thereby providing a grid return through condenser 18 or through the contacts 9 connected thereto, when these contacts are shorted by the lower sleeve 6.

The operation of the arrangement shown in Fig. 1 is as follows: When there is no pressure on lever 5 the electrodes 4 are held apart by the spring 10 and pairs of contacts 8 and 9 are both shorted. The upper contacts 8 thereby cause the potential of winding 14 to be impressed directly upon the grid resistor 13, the connections being such that this potential is 180° out-of-phase with the supply potential, hence the grid potential is 180° out-of-phase with the anode potential of rectifier 2. The lower contacts 9 short-circuit the condenser 18 and since the grid of rectifier 2 is negative when its anode is positive the rectifier will not pass any current. This is illustrated at the left of Fig. 3, A being the curve of supply potential and B being the curve of alternating grid potential from winding 14. When the metal parts to be welded are placed between the electrodes 4 and the operator applies pressure upon lever 5, the electrodes first clamp the pieces together with a pressure which may be adjusted by the spring 10a to be preferably greater than the pressure ordinarily used. Further downward movement of the lever 5 opens contacts 9 thereby removing the short circuit from condenser 18, but since this condenser has no charge and there is no potential difference between points 19 and 23, the opening of contacts 9 has no immediate effect upon the circuit but merely prepares it for the opening of contacts 8 which are adjusted to open slightly later. The opening of contacts 8 causes the current of secondary coil 14 to pass through resistance 16 which was formerly short-circuited, this resistance and the condenser 15 being so related that the potential of their common point and also of the grid of rectifier 2 will be retarded approximately 30° in phase as shown at C in Fig. 3. This shift in phase does not, however, cause the rectifier 2 to start until the next time its anode becomes positive, as shown at D. At this point the curves show that the grid is positive for 30 electrical degrees after the supply potential reverses in the direction to make the anode positive and therefore causes rectifier 2 to become conductive only within this range. The current passes through the primary of transformer 3 which in turn induces a very heavy current in its secondary. The apparatus is arranged to provide energy at a sufficiently high rate and sufficient current density through the spot to be welded so that the weld is completed by the single, half-cycle impulse thus started. This impulse is indicated in Fig. 3 by the shaded area under curve E which represents the voltage across the welding transformer primary. A very small portion of this impulse passes from point 19 through condenser 18 and its associated rectifier 20, the current being limited by the series resistance 22. Condenser 18 is thus charged to substantially the peak potential across transformer 3 and it is prevented from discharging by the rectifier 20. The voltage of condenser 18 is impressed between the grid and cathode of rectifier 2 and overcomes the peak positive potential of winding 14 in the next half-cycle. This is shown at F in Fig. 3. The grid thus remains negative for an indefinite time depending on the leakage of condenser 18 and the associated circuits.

It will be observed, therefore, that a portion of the first quarter-cycle of current through the welding transformer stores energy in condenser 18 and makes the grid of rectifier 2 negative after one impulse has passed so that it cannot pass another impulse until the initial conditions are restored. The total energy supplied for one movement of the lever 5 is thus limited to that which can pass through the power circuit during one positive half-cycle of anode supply. A tap on the primary is selected according to the parts to be welded so that this energy is sufficient to complete the weld.

As the operator releases lever 5 its upward movement first closes contacts 8, thereby returning the alternating potential from winding 14 to the 180° out-of-phase relation to the supply potential A; then contacts 9 close, thereby dissipating the energy stored in condenser 18, and then the work is released from between the electrodes 4, thus putting the apparatus back to its initial condition for making another weld.

When it is desired to use more power than can be obtained conveniently in one half-cycle, the circuit of Fig. 2 may be used to supply a full cycle of current to the welding transformer. For this purpose a second rectifier 24 is connected to the supply in opposite sense to rectifier 2, that is, its cathode and the heater winding 25 are connected to the same supply terminal as the anode of rectifier 2 so that the current of rectifier 24 will pass through transformer 3 in the opposite direction. The anode of rectifier 24 is connected through the primary of transformer 3 to the other terminal of the supply. An additional secondary winding 26 on the auxiliary transformer supplies alternating grid potential to rectifier 24 through a grid resistor 13, the other end of winding 26 being connected to a point 27 intermediate a choke 28 and a resistance 29, the choke and resistance being connected in series across the welding transformer primary. If desired a resistance may be used instead of choke 28 provided a condenser is used in place of resistance 29.

Otherwise the circuit of Fig. 2 is like that of Fig. 1 and its operation is as follows: If the gaseous rectifier 2 does not start, the similar rectifier 24 cannot start because the potential of winding 26 is made slightly greater than the anode potential of rectifier 24 and is arranged to have opposite polarity, thereby counteracting the potential of the supply which, it will be observed, is included in the grid return circuit of rectifier 24. When there is or has been no current through rectifier 2, point 27 assumes the potential of point 23. When, however, the rectifier 2 delivers a half-cycle impulse, as above explained, a portion of the current passes through choke 28 and resistance 29, thereby making point 27 more positive. Because of the energy stored in choke 28 this effect continues after the current from rectifier 2 falls to zero and the supply potential reverses. Point 27 thus remains positive for an instant and its potential, added to the supply potential (which is now making the anode of rectifier 24 positive) overcomes the negative potential of winding 26 and permits rectifier 24 to pass an impulse of current through the welding transformer. This current does not destroy the charge in condenser 18 nor charge it in the opposite direction because of the uni-directional characteristic of rectifier 20. Therefore, when the supply again reverses rectifier 2 will not pass current (its grid being maintained negative by the charge in condenser 18), there will be no additional energy stored in inductance 28, and the negative potential of winding 26 will prevent rectifier 24 from starting. Thus only one cycle of energy is supplied by the circuit of Fig. 2 each time the lever 5 is operated, and the amount of energy supplied for each welding operation is at least double that supplied by the circuit of Fig. 1. The arrangement of Fig. 2 has an advantage in that the reversal of current through the welding transformer destroys the residual magnetism in the core and thereby causes a maximum change of flux.

I have found that better welds can be obtained by the above described method and apparatus because the energy is supplied at a high rate for a very short time, namely 1/25th or 1/60th of a second or less, and because the time is accurately controlled. It is thus possible to join many metals which are otherwise difficult or impossible to weld satisfactorily and it overcomes the difficulties previously experienced due to oxidation of the material around the weld, or other effects of heating adjoining parts not actually required to be heated for effecting the weld. The time of each weld is made uniform by the circuits disclosed because the control is such that the current can only start after the supply potential reverses in a direction to make the anode of the controlling rectifier positive and within the range between approximately 15 electrical degrees thereafter, depending on the rectifier tube characteristic, and the 30 degree phase shift, regardless of the instant when the circuit was put in condition to pass current. The impulse is limited as to duration by the cyclic period of the supply and the provisions of the circuit for preventing restarting on the following cycle.

The cost of grid controlled rectifier tubes and other special purpose tubes is a major item in an automatic weld timer, hence the systems above described are economical in that they require only one grid controlled tube for half-wave and two such tubes for full-wave operation, and all of the auxiliary elements used in connection therewith are simple, reliable and readily obtainable at low cost.

A welding transformer for use with this or any timing device in which an odd number of half cycles are applied tends to have the residual point of the iron increased at each operation until the core becomes nearly saturated, unless special precautions are taken to prevent it. I prefer to use a special iron for the core of the welding transformer whose residual point returns to zero in a very short time after the magnetizing force is removed; an iron such as is commercially sold under the name of "Svea" has been found to meet these requirements when properly annealed.

The invention and the circuits described herein are not limited to welding operations but may be employed to supply impulses of current of predetermined duration for any apparatus adapted to use such impulses.

The embodiment of the invention as shown and described herein is for illustration only, it being understood that modifications may be made without departing from the spirit and scope of the invention.

I claim:

1. An electric timer comprising a grid controlled rectifier having an anode, a cathode and a starting control grid, said rectifier being adapted to be energized from an alternating current source and to deliver current impulses to a load, means for applying a voltage to said grid normally preventing starting of the rectifier, means for applying another voltage to said grid to make it positive only in the early part of the positive half-cycles of anode potential, and means for storing a part of the energy passed by said rectifier and thereby maintaining the grid negative on succeeding cycles.

2. An impulse timing circuit comprising a grid controlled rectifier adapted to be energized from an alternating current source and a grid circuit therefor adapted to control the passing of half-cycle pulses to a load, another grid controlled rectifier connected to pass opposite half-cycle pulses to said load, said first rectifier having means for storing a part of the energy passed by its initial impulse and applying voltage generated by said stored energy to the grid of the second rectifier, allowing it to pass current only in the half-cycle immediately following the half-cycle during which the first mentioned rectifier has passed current, and means preventing restarting of said first rectifier in the next cycle.

3. An electric circuit including a gaseous discharge tube having an anode, a cathode and a starting control grid, connections for energizing said electrodes from an alternating current source and delivering half-cycle impulses to a load, means for normally preventing the starting of a discharge in said tube, means for applying an alternating voltage to the grid when a discharge is desired, said voltage being approximately 150 degrees leading relative to the phase of the anode voltage, means for storing part of the energy passed by said tube, and means for applying a voltage generated thereby to said control grid thereby making it negative on the next and succeeding cycles.

4. An electric impulse timer comprising a grid controlled rectifier adapted to be energized from an alternating current source and to deliver current impulses to a load, a grid circuit for said rectifier including a source of alternating grid potential energized from said current source and normally preventing starting of said rectifier, means for shifting the phase of said grid potential to start the rectifier early in a positive cycle of its anode potential, a condenser in said grid circuit connected to be charged by the impulse thus started and apply a negative potential to the grid, and means for preventing discharge of said condenser.

5. An electric impulse timer comprising a grid controlled rectifier adapted to be energized from an alternating current source and to deliver current impulses to a load, a grid circuit for said rectifier including a source of alternating grid potential energized from said current source and normally preventing starting of said rectifier, means for shifting the phase of said grid potential to start the rectifier early in a positive cycle of its anode potential, a condenser in said grid circuit connected to be charged by the impulse thus started and apply a negative potential to the grid, means for preventing discharge of said condenser, a second rectifier connected to deliver current impulses to the load in the opposite direction to the first-mentioned impulses and means for storing a portion of the energy delivered by the first rectifier and applying a voltage generated thereby to the grid of the second rectifier to start the same only when the first rectifier has delivered a current impulse to the load.

6. The method for obtaining a single impulse of current from a grid controlled rectifier which comprises energizing the main electrodes of said rectifier from an alternating current source, impressing on the grid of said rectifier an alternating potential 180 degrees out of phase with its anode potential to prevent its starting, shifting the phase of said grid potential through a small angle to start a current through the rectifier near the beginning of the next positive half-cycle of anode potential, and biasing the grid negatively with a portion of said current to prevent starting the next time the anode becomes positive.

7. The method for obtaining an impulse of electrical energy from a grid controlled rectifier which comprises energizing the main electrodes of said rectifier from an alternating current source, impressing on the grid of said rectifier an alternating potential 180 degrees out of phase with its anode potential to prevent its starting, shifting the phase of said grid potential through a small angle to start the rectifier near the beginning of a positive half-cycle of anode potential, storing a portion of the energy of the impulse thus delivered and applying a voltage generated by the stored energy to the grid so as to negatively bias the same during succeeding cycles.

8. The method for obtaining an impulse of electrical energy from a grid controlled rectifier which comprises energizing the main electrodes of said rectifier from an alternating current source, impressing on the grid of said rectifier an alternating potential 180 degrees out of phase with its anode potential to prevent its starting, shifting the phase of said grid potential through a small angle to start the rectifier near the beginning of a positive half-cycle of anode potential, storing a portion of the energy of the impulse thus delivered and applying a voltage generated by the stored energy to the grid so as to negatively bias the same during succeeding cycles, and thereafter shifting the phase of said grid potential back to the 180-degree relation to the anode potential and dissipating said stored energy to put the rectifier in condition to pass another impulse.

9. An electric impulse timer comprising a grid-controlled rectifier adapted to be energized from an alternating current source and to deliver current impulses to a load, a grid circuit for said rectifier, a source of potential in said grid circuit which normally prevents starting of the rectifier, means for altering said potential to start the rectifier in the early part of a positive half-cycle of its anode potential, a condenser in said grid circuit connected to be charged by the impulse thus started and to prevent starting on the next and succeeding cycles, and means for controlling the discharge of said condenser.

10. In combination with a grid-controlled gaseous rectifier having a cathode and anode adapted to be energized from an alternating current source and to deliver current impulses to a load, a grid circuit for controlling the starting of said rectifier, a condenser in said grid circuit connected to be charged by the initial impulse passed by the rectifier and to apply a negative potential to the grid, a rectifier connected to prevent discharge of said condenser on the next and succeeding cycles of anode potential, and means for dissipating the charge of said condenser.

11. In combination with a grid-controlled gaseous rectifier having a cathode and anode adapted to be energized from an alternating current source and to deliver current impulses to a load, a grid circuit for controlling the starting of said rectifier, means connected in said grid circuit to store energy from the initial impulse passed by said rectifier and thereby apply a negative potential to the grid, means for retaining said energy and grid potential during the next and succeeding cycles of anode potential, and means for controlling the dissipation of said energy.

12. An electric circuit comprising a transformer, a grid-controlled rectifier in series therewith in its connection to an alternating current source to control the current in said transformer, a control circuit for said rectifier including means for starting a discharge current in the rectifier at a predetermined point in the positive half-cycle of its anode potential, and means responsive to said discharge current for timing the duration thereof.

13. An electric circuit comprising a load and connections to an alternating current power supply, a gaseous rectifier in series in one of said connections for controlling the current supplied to said load, and a timing control circuit for said rectifier, said circuit comprising control contacts, means for starting a discharge in said rectifier at a predetermined point in the next positive half-cycle of said supply following operation of said contacts, and means responsive to a current initiated by said starting means for stopping said discharge a predetermined time after it is started and preventing further discharge while said contacts remain in operated position.

DONALD V. EDWARDS.